United States Patent Office 2,995,598
Patented Aug. 8, 1961

2,995,598
BETA(ORTHO-ACETOXYPHENYL)PROPIONIC ACID AND SALTS THEREOF
Charles W. Bauer, Wellesley Hills, Mass., assignor, by mesne assignments, to Smith, Miller & Patch, Inc., New York, N.Y., a corporation of New York
No Drawing. Filed Feb. 27, 1958, Ser. No. 717,827
6 Claims. (Cl. 260—479)

This invention relates to an analgetic composition and provides orally ingestible analgetic materials of high efficacy and low toxicity.

Analgetic compositions are widely used in modern society for the relief of such pains as headaches, toothaches and those of rheumatic origin. Aspirin is most commonly used as the analgetic base for these compositions. It is, however, well known that certain persons have a sensitivity to aspirin and experience serious complications when it is taken, and that in large doses, aspirin is toxic.

The present invention provides a class of analgetic compounds consisting of beta (ortho-acetoxyphenyl) propionic acid, which has the structure

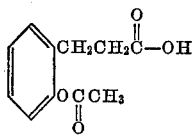

and its salts, such as its sodium, potassium, calcium and ammonium salts.

Tests of the analgetic compounds of this invention on rats reveal that they not only have greater analgetic properties than aspirin but are also of lower toxicity. The lower members of this class of compositions are crystalline solids which may be pulverized and tableted in dosage size units of e.g. 5 grains by well known means, with or without additional ingestible materials such as inert fillers, flavoring agents, lactose, dextrose, and other medicaments, such as phenacetin, caffeine, and anti-histamine compounds. The tablets may also be coated with sugar or other flavoring material or with an enteric coating effective to delay their action until after they have entered the small intestine. These compositions, particularly in the salt form, may be also dissolved or dispersed in water or other potable liquids and administered in the form of a solution or suspension. In this respect the compounds of this invention are superior to aspirin which suffers the disadvantage of decomposing in the presence of water, and its alkali metal salts are notoriously unstable.

The acid may be synthesized by reactions by which an acetoxy group and a propionic acid group are joined to a benzene nucleus in the ortho relationship. In a preferred procedure salicylaldehyde is first acetylated to form ortho-acetoxycinnamic acid, from which the trans isomer is obtained. The trans ortho-acetoxycinnamic acid is then hydrogenated to beta (ortho-acetoxyphenyl) propionic acid. The salts of the acid may be prepared by conventional techniques well known in the art, such as by reacting the acid with a base to produce the corresponding salt.

A typical representative embodiment of this invention is shown in the following example describing in detail the preparation of beta (ortho-acetoxyphenyl) propionic acid.

Ninety grams of salicylaldehyde and 120 grams of potassium acetate together with 150 grams of acetic anhydride are mixed together and heated to a temperature of 140° C. for one hour. The mixture is then cooled and extracted by shaking it with an equal volume of ether. The ether layer is next separated and shaken thoroughly with an equal volume of an aqueous alkaline solution containing 10% by weight of sodium carbonate. The aqueous layer is mixed thoroughly with 20 grams of activated charcoal and then filtered and acidified with 6 N hydrochloric acid. A white precipitate of the trans isomer of ortho-acetoxycinnamic acid having a melting point of 153–157° C. is obtained. This precipitate is collected and dried at 110° C.

The trans ortho-acetoxycinnamic acid is dissolved in 150 cc. of ethyl alcohol to form a solution to which is added 0.1 gram of palladium (on charcoal), and is then reduced in a Parr Hydrogenator at a temperature of about 20° C. and a hydrogen pressure of 2-3 atm. An oily liquid separates out and may be crystallized by cooling to 5° C. The crystals are separated and dissolved in ethyl ether and are then re-crystallized in purified form by adding petroleum ether to initiate crystallization, and evaporating away the solvent. These crystals have a melting point of 55–57° C. and consist of beta (ortho-acetoxyphenyl) propionic acid.

In the foregoing example the following reactions are believed to occur:

(1) Preparation of the trans isomer of O-acetoxycinnamic acid

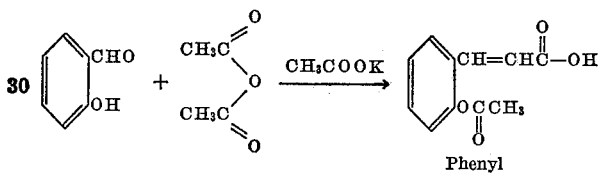

Phenyl (2) Reduction to beta (O-acetoxy phenyl) propionic acid with hydrogen and palladium

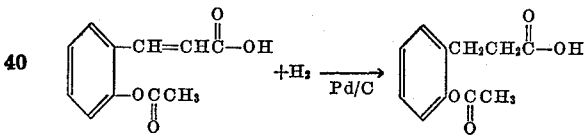

The sodium salt of the acid may be prepared by dissolving the acid in water and then adding the stoichiometric equivalent amount of sodium bicarbonate. After the reaction is complete the water may be evaporated to yield the dry salt. Other sodium bases may also be used in place of sodium bicarbonate, for instance sodium carbonate or hydroxide. Other salts may be prepared in similar manner by means of bases of the corresponding metal.

The analgetic properties of these materials were tested and found to be markedly superior to aspirin while the toxicity was much lower.

This application is a continuation-in-part of my copending application Serial No. 639,186, filed February 11, 1957, now abandoned.

Having thus disclosed my invention and described in detail a preferred example thereof, I claim and desire to secure by Letters Patent:

1. Beta (ortho-acetoxyphenyl) propionic acid.
2. The sodium salt of beta (ortho-acetoxyphenyl) propionic acid.
3. The potassium salt of beta (ortho-acetoxyphenyl) propionic acid.
4. A compound selected from the group consisting of beta (ortho-acetoxyphenyl) propionic acid, the non-toxic metal salts thereof and the ammonium salt thereof.
5. The calcium salt of beta (ortho-acetoxyphenyl) propionic acid.

6. The ammonium salt of beta (ortho-acetoxyphenyl) propionic acid.

References Cited in the file of this patent

UNITED STATES PATENTS

| | | |
|---|---|---|
| 1,113,742 | Beneudes et al. | Oct. 13, 1914 |
| 1,217,862 | Grunewald | Feb. 27, 1917 |
| 2,681,363 | Schwenk et al. | June 15, 1954 |

OTHER REFERENCES

Pool et al.: Berichte 63B, pp, 766–8 (1930).

Batterman: J.A.M.A., vol. 155, No. 11, pp. 695–698 (1954).